(12) United States Patent
Sipperley et al.

(10) Patent No.: US 11,536,638 B2
(45) Date of Patent: Dec. 27, 2022

(54) SYSTEM FOR DETERMINING AN ENSEMBLE CHARACTERISTIC OF A PARTICLE-LADEN FLOW

(71) Applicant: Spraying Systems Co., Wheaton, IL (US)

(72) Inventors: Chad Sipperley, Palm City, FL (US); Rudolf J. Schick, Forest Park, IL (US); Kyle M. Bade, Rockford, MI (US)

(73) Assignee: Spraying Systems Co., Wheaton, IL (US)

( * ) Notice: Subject to any disclaimer, the term of this patent is extended or adjusted under 35 U.S.C. 154(b) by 789 days.

(21) Appl. No.: 16/442,067

(22) Filed: Jun. 14, 2019

(65) Prior Publication Data

US 2019/0383716 A1 Dec. 19, 2019

Related U.S. Application Data

(60) Provisional application No. 62/685,104, filed on Jun. 14, 2018.

(51) Int. Cl.
| | |
|---|---|
| *G01N 15/02* | (2006.01) |
| *G06G 7/48* | (2006.01) |
| *G06G 7/52* | (2006.01) |
| *G01N 15/00* | (2006.01) |

(52) U.S. Cl.
CPC ......... *G01N 15/0205* (2013.01); *G01N 15/02* (2013.01); *G06G 7/485* (2013.01); *G06G 7/52* (2013.01); *G01N 2015/0053* (2013.01)

(58) Field of Classification Search
None
See application file for complete search history.

(56) References Cited

U.S. PATENT DOCUMENTS

| | | | | |
|---|---|---|---|---|
| 4,854,705 A | * | 8/1989 | Bachalo | G01N 15/0205 356/336 |
| 4,986,659 A | * | 1/1991 | Bachalo | G01N 15/0205 356/336 |
| 5,784,160 A | * | 7/1998 | Naqwi | G01B 11/10 356/336 |
| 7,788,067 B2 | * | 8/2010 | Bachalo | G01B 9/02074 702/194 |
| 10,578,538 B2 | * | 3/2020 | Bachalo | G01N 15/0227 |
| 10,705,001 B2 | * | 7/2020 | Bachalo | G01N 15/1434 |
| 2016/0238510 A1 | * | 8/2016 | Bachalo | G01N 15/1429 |
| 2019/0219491 A1 | * | 7/2019 | Sivathanu | G01N 15/0211 |
| 2021/0148802 A1 | * | 5/2021 | Sipperley | G01N 15/0227 |

* cited by examiner

*Primary Examiner* — Alexander A Mercado
(74) *Attorney, Agent, or Firm* — Leydig, Voit & Mayer Ltd

(57) ABSTRACT

A system and method are described for rendering a characteristic for a set of particles passing through a measurement volume of a particle optical measurement system. The method includes acquiring raw particle data for the particles passing through the measurement volume. The raw particle data comprises a set of raw particle records. Each particle record comprises at least: a trajectory of at least one particle, and a second primary mark of the at least one particle whose value influences an effective sampling area corresponding to the measurement volume. The method includes generating and storing an effective sampling area based upon: the trajectory of the at least one particle, and the second primary mark. Thereafter, an ensemble characteristic is rendered for the set of particles by performing an operation on the sampling area-corrected set of particle records.

14 Claims, 7 Drawing Sheets

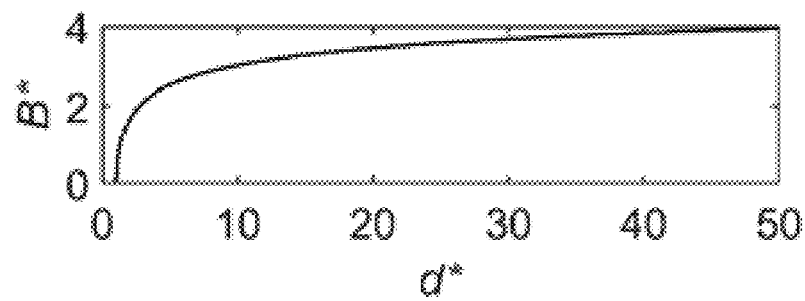
FIG. 2
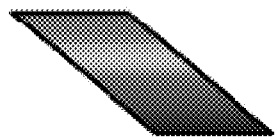 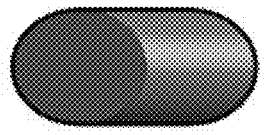 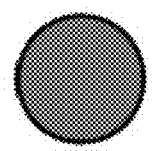
FIG.3a $\theta = 0°; \phi = 0°$    FIG. 3b $\theta = 90°; \phi = 0°$    FIG. 3c $\theta = 0°; \phi = 90°$
 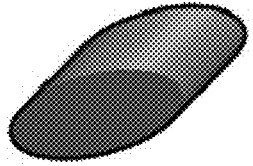 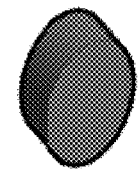
FIG. 3d $\theta = 20°; \phi = 0°$    FIG 3e $\theta = 30°; \phi = -40°$    FIG. 3f $\theta = 40°; \phi = 75°$

SYSTEM FOR DETERMINING AN ENSEMBLE CHARACTERISTIC OF A PARTICLE-LADEN FLOW

CROSS-REFERENCE TO RELATED APPLICATION

This application is a non-provisional of U.S. Provisional Application Ser. No. 62/685,104, filed Jun. 14, 2018, entitled "ADVANCED PROCESSING FOR SPRAY FLUX MEASUREMENTS USING PHASE-DOPPLER INTERFEROMETRY," the contents of which are expressly incorporated herein by reference in their entirety, including any references therein.

AREA OF THE INVENTION

The present disclosure generally relates to systems and methods for measuring sprays based upon individual measurements taken of individual droplets and thereafter performing analysis on an ensemble of such individual measurements of the droplets that pass through a measurement region of a measurement system. More particularly, the present disclosure relates to a measurement system where at least a droplet dimension (e.g. diameter) is determined for individual droplets passing through a measurement volume.

BACKGROUND OF THE INVENTION

Spray flux is a spatially-dependent vector characteristic of a flow field representing the net time-averaged or ensemble-averaged volumetric transport of the liquid phase per unit area per unit time. Spray flux may be expressed in terms of $cc_{liquid}/(cm^2\ s)$.

$$\Phi = \frac{1}{T}\sum_i \frac{\pi d_i^3}{6}\frac{1}{A_i}\hat{v}_i \qquad (1)$$

Where T is the total sampling time. For the i-th droplet, d is the diameter, v is the unit velocity vector, and A is the projected area of the measurement volume, normal to v.

Spray flux is difficult to measure in practice. Mechanical patternation such as sampling rakes and grids may be used but these are intrusive measurements. If used without isokinetic sampling, they may not accurately measure the liquid volume carried by small droplets. Unless some external knowledge of droplet velocities exists, only instruments that can determine a liquid mass-velocity relationship on a per-droplet-basis or ensemble basis can be used to determine spray flux. The candidates for flux-measurement-capable, non-intrusive sprays diagnostics are reduced to magnetic resonance imaging, double-pulse techniques (e.g. planar image velocimetry), and phase-Doppler interferometry (PDI, PDA, PDPA). Phase-Doppler has spatial, temporal, and/or droplet number density advantages over the other two techniques.

Spray flux is computed from an ensemble of individual droplet measurements assumed to be members of a stationary system. Spray flux is rendered from a vector sum of all droplets in a data set acquired by a measuring system that is thereafter: (1) divided by an effective sampling area of the measurement volume normal to the droplet velocity, and (2) divided by a total sampling time in an ensemble-average or time-average sense.

Determining spray flux using a phase-Doppler interferometer and state of the art instrumentation software is predicated on an assumption that a substantial majority of spray flux droplet trajectories are aligned parallel to a primary (sizing) velocity component (See FIG. 1, $V_1$) of a spray flux data acquisition instrument. This assumption is not generally met by acquiring raw data for determining the spray flux by traversing a measurement point through a plane of a spray pattern. Rotating the spray nozzle above the measurement point such that the spray flux droplet velocity vectors align with $V_1$ yields good agreement between calculated spray flux values and a spray flux determined by a sampling tube data. However, mechanical requirements of a sensing harness used to meet the above-described ideal measurement condition are onerous. Furthermore, not all spray flows have a strong orientation to the flux vector—for example, the recirculation zone of a hollow-cone atomizer does not exhibit strong orientation.

SUMMARY OF THE INVENTION

A system and method are described herein for rendering a characteristic for a set of particles passing through a measurement volume of a particle optical measurement system. Notably, the disclosed system and method address a difficulty in accurately determining, for example, a spray flux from phase-Doppler measurements due to an inability to accurately characterize an effective sampling area of the measurement volume through which individual particles pass during measurement. The effective sampling area of the measurement volume is a function of at least: (1) a particle trajectory into the measurement volume; and (2) a second primary particle mark (e.g. diameter). Other embodiments compensate for measurement errors that may result in a reduction of the effective sampling volume for a given droplet such as detector saturation or intensity validation.

As will be explained by reference to the illustrative examples provided herein, a system and method are described for rendering a characteristic for a set of particles passing through a measurement volume of a particle optical measurement system. The method includes acquiring raw particle data for the particles passing through the measurement volume. The raw particle data comprises a set of raw particle records. Each particle record comprises at least: a trajectory of at least one particle, and a second primary mark of the at least one particle whose value influences an effective sampling area corresponding to the measurement volume. The method includes generating and storing an effective sampling area based upon: the trajectory of the at least one particle, and the second primary mark. Thereafter, an ensemble characteristic is rendered for the set of particles by performing an operation on the sampling area-corrected set of particle records.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is a chart relating effective beam diameter (B*) as a function of droplet diameter (d*);

FIGS. 3a-3f depict a set of projections for a single representative sampling volume geometry as viewed along six different droplet trajectories through a measurement volume, and where 3a is an assumed projection for a state-of-the-art area calculation (irrespective of droplet trajectory);

DETAILED DESCRIPTION OF THE INVENTION

Figure 1:
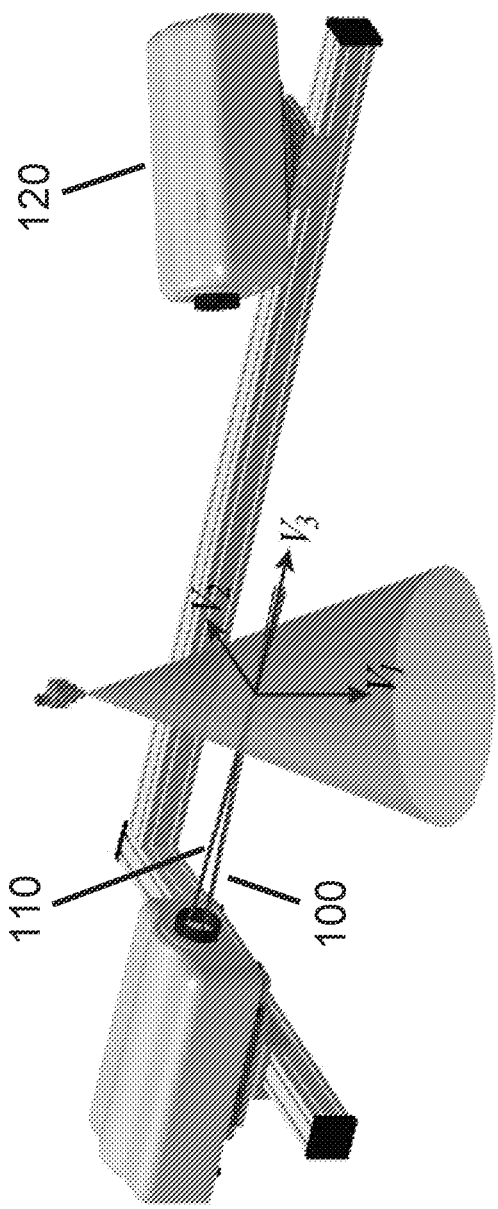
FIG. 1 is a schematic block diagram of an exemplary system arrangement for carrying out an illustrative example of the invention

In the present disclosure, a robust system and method are described to determine spray flux results using phase-Doppler data of spray droplets having arbitrary droplet velocities and arbitrary measurement volume geometries. The system and method described herein are adapted not only for measurements in a laboratory environment, but also in real world spray applications, to provide a live, real-time measurement of various spray parameters using phase-Doppler sensors. For example, in an agricultural application where a plurality of spray nozzles is arranged along a boom, a single sensor may be used to accurately and discretely monitor and measure spray parameters of different spray nozzles on the boom during operation, to provide a live feedback to a controller operating the nozzles. Moreover, the method described herein is applicable to any flux-based particle characterization instrument or technique for which the effective sampling area is dependent upon the trajectories of the measured particles as well as at least one additional characteristic (mark) of the measured particles.

An aspect of determining spray flux is determining an "effective sampling area" or "effective area" of a measurement volume of the phase-Doppler interferometry system. The effective sampling area is dependent upon one or more marks of the particles individually or as an ensemble. In one embodiment, the system incorporates a method that includes establishing a model representation of a measurement volume as a function of a particle trajectory and at least one other mark(s) such as droplet size. The method further includes determining an effective sampling area according to a projected area of the measurement volume (e.g. a measurement volume defined by two intersecting beams of a phase-Doppler interferometry system as sensed through an aperture in the optical receiver) along the particle trajectory.

Another aspect of accurate determination of a spray flux is performing a validation process, and adjusting the "effective sampling area" for an ensemble of droplet data points used to calculate the spray flux, using a predicted distribution of one or more marks for random transits across the measurement volume created as a function of the particle trajectory and at least one other mark(s). Thus, in accordance with a further aspect of the illustrative example, the method for determining spray flux includes determining a fraction of the effective sampling area that would not result in valid measurements from the calculations or distribution predictions. An area fraction that results in invalid measurements is removed from the effective sampling area within the measurement volume. Furthermore, limits to an acceptable range of results of mathematical expressions involving one or more marks are applied to measurements within the valid fraction of the measurement volume. Thereafter, the effective sampling area to be rejected due to the limits applied is removed. This can be determined from an evaluation of the limits applied to the predicted distributions. The method steps are applied for all particles or ensembles of particles as appropriate, and ensemble statistics (e.g. spray flux) are determined for the system using the calculated effective sampling areas.

By way of example, the system is used to determine a flux of a nozzle spraying water droplets. The flux-based particle characterization instrumentation is a phase-Doppler interferometer (PDI) of Artium Technologies, Inc. The marks generated by the PDI system include: droplet diameter, peak signal intensity, and crossing length. An example of an ensemble statistic for the system is spray flux.

In general, Phase-Doppler interferometry as a measurement method exhibits a trajectory dependence to its effective sampling area. In addition to trajectory, the effective sampling area for PDI is a function of droplet diameter.

The term "particle" is used in the context of a multi-phase system flow to describe particles that are in a dispersed phase (i.e., one phase enveloped by another). Examples include bubbles in water, droplets in air, and cement dust in air.

The term "mark" or "marks" is used to denote a physical quantity associated with an individual particle that describes some aspect of that particle or its interaction with the instrumentation. Effective diameter, temperature, slenderness ratio, and velocity components are all examples of marks. Other parameters such as particle number density and mean diameter, among others, are not described by the marks term because they are statistical quantities that represent physical characteristics of ensembles of particle and are not physical features of individual particles.

In the context of the present disclosure, the term "Flux-Based Particle Characterization Instrumentation" is meant to describe flux-based instrumentation that interrogates a region of space and records some information about the particles (individually or as an ensemble) that pass through or into a measurement volume (e.g. the intersecting volume of two laser beams in a PDI system). Flux-based particle characterization instrumentation differs from concentration-based instrumentation, which might interrogate a region of space at one or many instants in time and characterizes the particles contained in that volume at that instant in time. A rain gauge and a phase-Doppler interferometer are examples of flux-based instrumentation. A shadowgraph imaging system and a planar image velocimetry (PIV) instrument are examples of concentration-based instrumentation.

Turning to FIG. 1, an exemplary phase-Doppler interferometry system is schematically depicted. As will be readily appreciated by those skilled in the art, a phase-Doppler system includes a pair of coherent laser beams (e.g. a first laser beam 100 and a second laser beam 110) that intersect to form an overlapping beam volume. A receiving optics system 120 images a fraction of the overlapping beam volume, through a slit aperture, onto at least two detectors. The portion of the overlapping beam volume viewed by the at least two detectors through the slit aperture, is referred to as the "measurement volume" of the system.

At least one component of a droplet's velocity can be determined from frequency of the light scattered by the droplet onto the at least two detectors and the droplet size can be determined from a phase shift between detectors at that frequency. Since the operation and structure of phase-Doppler systems are well known, the discussion will now turn to an exemplary processing of the droplet data acquired by such a system via the receiving optics system 120.

Data sampling apparatuses, such as phase-Doppler interferometry systems, exhibit sampling bias depending on the marks of each particle. Accurately determining spray flux-based statistics requires accurate determination of what is referred to herein as "effective cross-sectional sampling area" (effective sampling area) of a measurement system as a function of the particle's mark(s) and trajectory.

A physical model is developed to render a value for "effective sampling area" of a system as a function of its marks based upon particle (e.g. droplet) detection characteristics of the measurement system. The parameters of the physical model may be based in whole/part upon first principals or by analyzing the data. The physical model is a function of marks that are referred to herein as "primary marks." Droplet velocity (speed/direction) in the measurement volume is a mark in the physical model described, by way of example, herein in accordance with illustrative examples of the disclosure.

"Secondary marks" are marks that aren't used to determine the effective sampling area. A physical model can be used to determine the expected distribution of secondary marks for a given set of primary marks—assuming a random sampling. Conversely, the expected distribution may be used to partition the effective sampling area over a range of values of the secondary marks. As such, the secondary marks may play a role in a "validation" operation described, by way of example, herein below.

Droplet measurement instruments utilize a droplet data record/instance validation criterion to determine whether to accept (or reject) a measurement. Each measurement of a droplet, in the illustrative example, results in a droplet data record comprising multiple marks describing the sensed droplet particle passing through the measure volume of the phase-Doppler interferometry system. Based upon experimentation and theoretical calculations, certain combinations of marks for a sensed droplet instance are physically impossible. Any droplet data record containing an impossible combination of mark values is rejected without further consideration. However, in the illustrative example, droplet data records containing mark combinations having ambiguous combinations (i.e. both faulty and valid measurements may result in such combinations) are also eliminated.

When validations are based on secondary marks, valid measurements rejected by the process are accounted for by statistically determined adjustments. The partitioning of the effective sampling area of the system allows one to determine what fraction of "real" measurements should have been represented by a given set of secondary marks. Eliminating that combination of marks as a valid mix effectively reduces the sampling area to not include that "region"—reducing the area by a known amount. Such partition functions could even be functions of more than one secondary mark.

A theoretical model of the measurement volume creates a three-dimensional volume for which it should be possible to detect a particle of given characteristics (in our case, droplets of a given diameter). The effective sampling area is the projection of the droplet-diameter-dependent measurement volume onto a plane normal to the droplet's trajectory. The trajectory may be chosen on a per-droplet basis or may be based on some mean value for an ensemble of droplets. The theoretical model of the measurement region may be very simple (see FIGS. 3a-3f and FIG. 4) providing projections for a cylinder with slant ends as described below) or extremely complicated (e.g. considering the effects of partially-overlapped laser beams on the interferometry signals).

Regarding the measurement volume geometry, by way of example, three assumptions are made to describe a geometry of the measurement volume of a phase-Doppler interferometry system: (1) the transmitter beam overlap region is a cylinder having a Gaussian intensity cross-sectional profile; (2) the intensity of light collected by the receiver scales as a square of a droplet diameter; and (3) for a given optical setup there exists some threshold intensity value above which the instrument is capable of detecting presence of a droplet in the measurement volume. The final aspect of the measurement volume that must be included is the projected receiver slit. Phase-Doppler interferometry receivers incorporate one or more air slits into receiver optics to limit detected droplets to a small fraction of the beam overlap region. This slit effectively "cuts" the cylindrical beam overlap region at the receiver offset angle at a width set by the slit width magnified by the receiving optics. While the true geometry is more complicated, such an approximation is reasonable for the shallow beam crossing angles normally used for phase-Doppler measurements. Additionally, more realistic geometrical representations are consistent with the approach described here.

Regarding the effective beam diameter, let the intensity of light scattered by a droplet to the receiver be represented as a function of the droplet diameter, d, and the distance of that droplet from the centerline, r. For drops whose diameter is on the order of the laser beam radius, the radial position r may be defined relative to the incident glare spot rather than the droplet center.

$$I(r,d)=(kd^2)I_o \exp(-2r^2/w_o^2) \qquad (2)$$

Where $I_o$ is the beam intensity at the center of the cylindrical measurement volume, k is a constant value that represents a fraction of light scattered by a droplet that is incident on the detectors, and $w_o$ is a laser beam radius: a distance from centerline where the intensity has fallen to $1/e^2$ of $I_o$. Set H as the threshold intensity for detection and solve for r|H as a function of d. Define $B_{\it eff}(d)=2$ r|H as the effective beam diameter. As a function of d, H, and $I_o$, the effective beam diameter is:

$$B_{\it eff}(d)=\omega_o[2 \ln(d^2kI_o/H)]^{1/2} \qquad (3)$$

Io and k are constants and H is a function of the optical setup, detector gains, the signal-to-noise environment, etc. but it is not a function of the droplet diameter. H is assumed fixed for any given phase-Doppler record. As $B_{\it eff}$ represents a physical distance, the term inside the square root is nonnegative. Therefore, the term inside of the natural logarithm is greater than or equal to unity. The minimum diameter for which $B_{eff}$ is a real number can then be solved for as:

$$d_{min}=(H/kI_o)^{1/2} \quad (4)$$

The minimum diameter is the droplet size that would yield the threshold intensity at the beam centerline and is the limit of detection for a phase-Doppler setup. It is a fixed value for a given setup but can be varied by changing the instrument's performance. The minimum diameter can be reduced by reducing the threshold intensity necessary for detection (increasing the detector gain, e.g.), by increasing the scattered light from the droplet (by configuring the receiver to use a shorter focal length lens and therefore to collect over a larger solid angle, e.g.) or by increasing the intensity at the center of the measurement volume by focusing the laser beams more tightly or by increasing the laser power. Though one can model $d_{min}$ as a function of instrument operating parameters, it is most often determined from evaluation of the phase-Doppler data.

The effective beam diameter can now be cast as a function of the laser beam radius, the droplet diameter, and $d_{min}$. Furthermore, if one normalizes crossing distances by the laser beam radius, co, and droplet diameter by $d_{min}$, there is a universal function to represent the crossing length of all drops through the model probe volume.

$$B_{eff}^*=2[\ln(d^*)]^{1/2} \quad (5)$$

Where $B_{eff}^*=B_{eff}/\omega_o$ and $d^*=d/d_{min}$. FIG. 2 illustratively depicts this function. In FIG. 2, the effective beam diameter is presented versus droplet diameter. The beam diameter is normalized by the laser radius and the droplet diameter to the minimum detectable droplet diameter.

Regarding the trajectory-dependent projected area, when viewed along $V_1$, the measurement volume projection in two-dimensional image plane is a parallelogram. See FIG. 3a. The skew angle of the corners is set by the receiver offset angle (P). A distance between a first pair of opposite faces is established by a magnified receiver slit aperture, $W_M$. A distance between a second pair of faces is the effective beam diameter—a function of droplet diameter as determined from Equation 5 above. The resulting cross-sectional area as a function of droplet diameter is:

$$A_0(d)=W_M B_{eff}(d)/\sin(\varphi) \quad (6)$$

Because $B_{eff}$ increases with diameter, so too does the effective sampling area. A known bias in phase-Doppler measurements is an oversampling of larger droplets in a spray distribution. Application of a "probe volume correction" or "bias correction" removes the larger droplet oversampling bias. Equation 6 is the correct sampling area normal to $V_1$ (See FIG. 3a). However, it is not an accurate description of the sampling area along other droplet path trajectories through the measurement volume of the phase-Doppler interferometry system. For example, along $V_3$, the sampling area is a circle of diameter $B_{eff}$ (FIG. 3c). Along $V_2$ the sampling area would be a rectangle with half an ellipse on either end (FIG. 3b). In the illustrative examples of FIG. 3, geometries are presented for the sampling area of a phase-Doppler measurement region for a given effective beam diameter and magnified receiver aperture (i.e. all variations arise from varying a trajectory of a droplet through the measurement volume). In the illustrative example, FIGS. 3a, 3b, and 3c are projections along the three primary components of velocity, and FIGS. 3d, 3e, and 3f are projections along velocity vectors with multiple components.

In view of the droplet trajectory-dependence on an effective area determination, as illustratively shown in FIGS. 3a-3f, a trajectory-specific projection of the measurement volume is created for every allowed trajectory to facilitate determining an effective area based upon a sensed droplet trajectory.

This could be done on a per-droplet basis. However, the trajectory-dependences can be stored as a lookup table containing a finite number of trajectories. Though the remaining discussion is extensible to three components of velocity, from this point forward only velocity vectors in the $V_1$-$V_2$ plane are considered; i.e. $\phi=V_3=0$. By ignoring the third component of velocity one need only consider drop angles, $\theta$, from 0 to 90 degrees. Rather than compute projected areas based on all possible combinations of effective beam diameters and magnified slit apertures, the geometry can be non-dimensionalized to simplify the task.

Previously the effective beam diameter was normalized by the laser beam radius as in Equation 5. Here, the magnified receiver aperture width is used to normalize all lengths:

$$B'=B_{eff}/W_M \quad (7)$$

$$A'=A/W_M^2 \quad (8)$$

Figure 4:
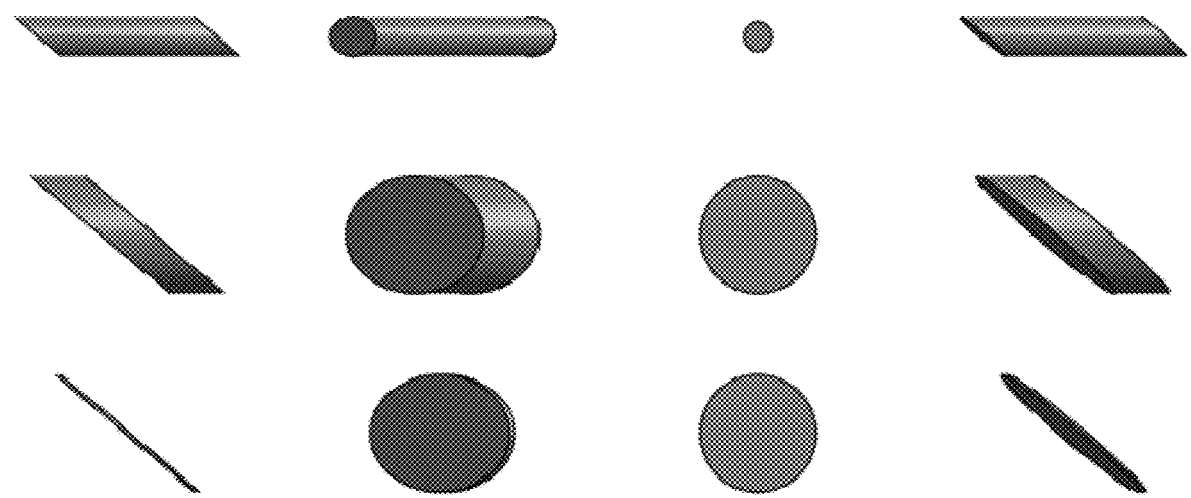
FIG. 4 depicts representative sampling volumes where changes across each of the three rows illustratively depict variations in sampling area associated with varying a droplet trajectory for three different measurement volumes, where each row represents a single measurement volume with varying (effective beam diameter and camera slit width) aspect ratios—with the beam-to-slit width ratio increasing from the top to the bottom row, and where each column represents the view of each measurement volume along each of four different droplet trajectories.

Turning to FIG. 4, a small value of B' (with the slit width remaining unchanged) produces a measurement volume that tends to a cylinder with slanted ends (the top row). A large value of B' (with the slit width remaining unchanged) describes a measurement volume that more closely resembles an elliptical disk (the bottom row). The rows of FIG. 4 illustrate measurement volumes for different aspect ratios between the effective beam diameter and the projected slit aperture (B'). From top to bottom B'=0.03, 0.3, and 3. From left to right the first three projections are the same as for FIGS. 3a, 3b, and 3c. The right-most figure in each row is at $\theta=10°$, $\phi=0°$. Note for small B' the geometry is very nearly a cylinder. As such the projected area does not change substantially when viewed from different $\theta$. Contrast that to the large B' case where a small change in angle from $\theta=0$ to 100 results in a large change in the sampling area.

Figure 5:
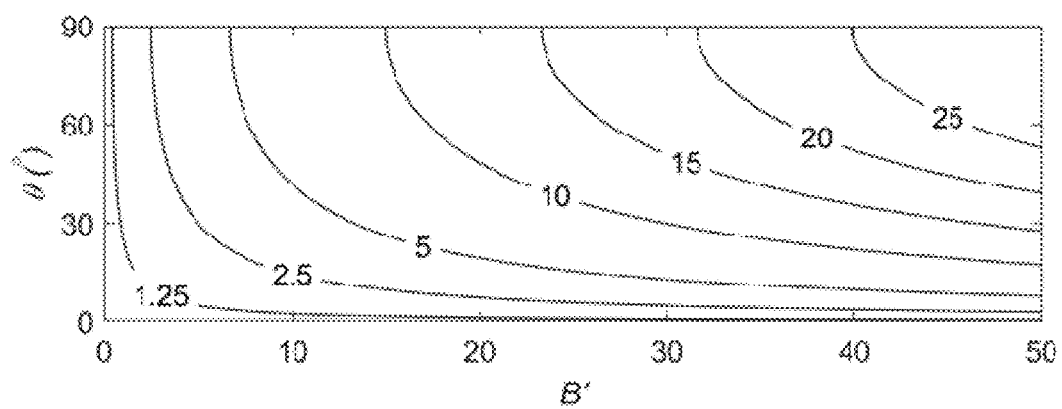
FIG. 5 is an exemplary table representing the ratio of the trajectory-dependent area to that generally used for flux calculations.

The non-dimensional area, A', is that enclosed by the outline of the rotated measurement volumes as in FIG. 4. One can now build a table of A' over a range of B' for $0 \le \theta \le 90$ degrees. Further, normalize by the area at $\theta=0$ (as from Equation 6). Contours of the resultant ratio, [A'(B', $\theta$)/A'(B', $\theta=0$)] are shown in FIG. 5. FIG. 5 represents the ratio of the trajectory-dependent area to that generally used for flux calculations—and is a scaling factor for correcting a beam-width dependent error in flux values.

To summarize the above discussion of droplet trajectory and effective beam width dependencies on effective sampling error (correction), to determine the effective sampling area for each droplet, one needs to know the laser beam radius $\omega_o$ and minimum droplet diameter $d_{min}$ for the optical setup, and the drop trajectory angle $\theta$. From that data, the effective beam diameter is calculated (Equation 5) and the area at $\theta=0$ (Equation 6). The beam diameter and area are normalized using Equations 7 and 8. Thereafter, the table in FIG. 5 is used to scale (correct) the area of the droplet to the correct value. Extension to three velocity components simply requires computation of projections from more views and extension of the table in FIG. 5 from a function of two dimensions to a function of three dimensions—by adding $\phi$ as a dependent variable.

A further aspect of accurate measurement of spray flux is determining a portion of the droplet data points that will be deemed to be valid data instances. In that regard, a potential source of measurement error in phase-Doppler interferometry systems is beam saturation. Regarding saturation beam diameter, for a given instrument setup, there is an intensity beyond which the amplifiers will saturate and respond in a nonlinear fashion. A droplet whose intensity profile starts at the limit of detection, reaches this saturation intensity, and diminishes to the limit of detection once again shall be defined as having traversed the maximum crossing length through the measurement volume, $L_{max}$. For any droplet whose effective beam diameter is less than the maximum crossing length, saturation is not a concern. Droplets sufficiently large to saturate the detectors only do so if their trajectory takes them sufficiently close to the centerline. The saturation beam diameter, a function of the droplet diameter, shall be defined as twice the distance from the centerline to where the intensity is equal to the saturation limit. It is also simply the effective beam diameter minus the maximum crossing length for any droplet sufficiently large to saturate the detectors.

$$B_{SAT} = \begin{cases} 0, & B_{eff} < L_{max} \\ B_{eff} - L_{max}, & \text{otherwise} \end{cases} \quad (9)$$

Droplets capable of saturating the detectors may not pass within the saturation beam radius of the centerline but may otherwise cross the measurement volume. The projected area of this exclusion region is calculated in the same way as the projected area was in the previous section. However, for the saturation area, the effective beam diameter is replaced with the saturation beam diameter when accessing the lookup table. To correct sampling errors for saturation effects, the saturation area is subtracted from an area calculated for each droplet. This is a rigorous means to deal with the effects of saturation on droplet sampling as well as flux. As such it effectively eliminates the dynamic size range limitation of PDI that has been a part of the technique since its inception.

Regarding the minimum (and maximum) crossing length, phase-Doppler interferometry signal processors require a minimum record length to determine drop velocities and especially diameters, and this length may vary by processor type even for a single instrument manufacturer. The minimum record length, sampling rate, and droplet speed will combine to establish a minimum crossing length on a per-droplet basis. When computing trajectory-dependent sampling areas as in the previous section, the distribution of (normalized) crossing distances for each projection should be established. When evaluating the sampling area for each drop, one can then determine the fraction of the possible crossing locations which would lead to a transit length below the minimum. This area is then removed from the sampling area on a per-droplet basis.

Generally, the amount of possible sampling area removed due to minimum crossing lengths is minimal but may be significant for small, fast drops. Additionally, there may be times in which one may wish to add a crossing distance cutoff during data post-processing in terms of crossing time, crossing distance, or in terms of peak intensity—particularly to eliminate droplets with low signal-to-noise ratio. As mentioned previously, there is a functional relationship between peak intensity and crossing length so a cutoff of one is effectively a cutoff of the other and may be a function of, e.g. droplet diameter.

Figure 6:
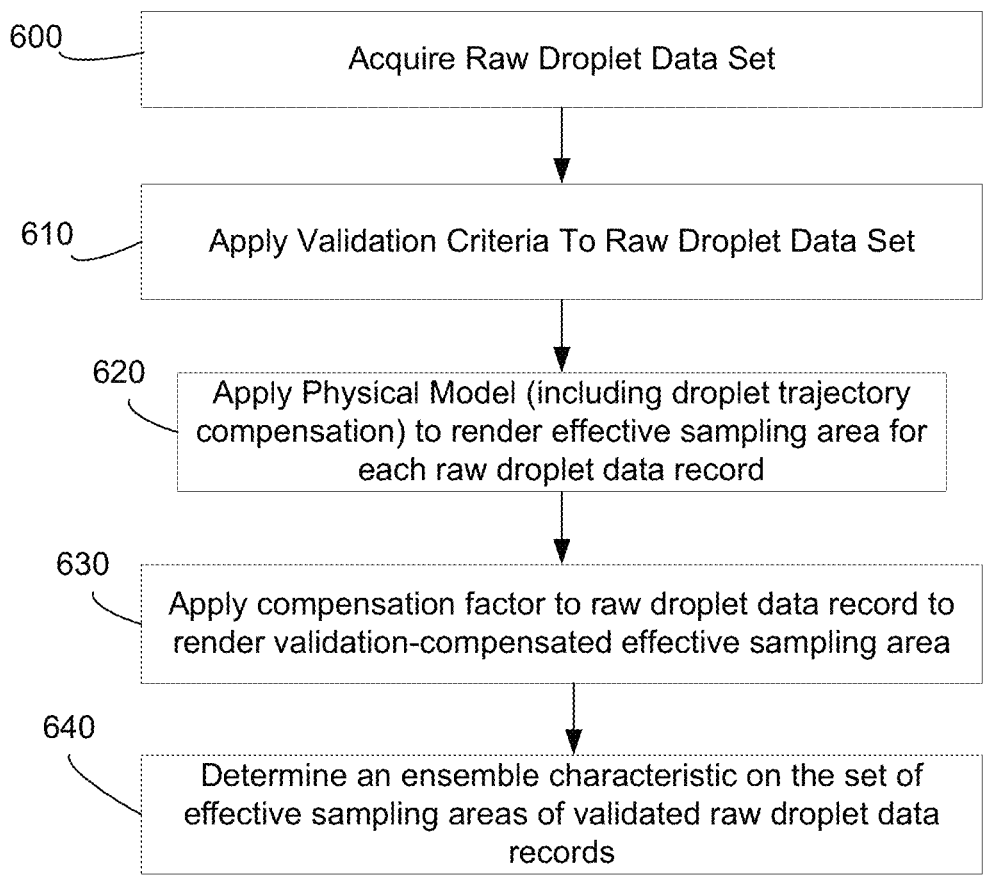
FIG. 6 is a flow diagram summarizing operations of a method for measuring spray flux in accordance with an illustrative example

Turning to FIG. 6, a flowchart summarizes steps for an exemplary method of acquiring and processing spray flux in accordance with illustrative examples provided herein. During a droplet data set acquisition stage 600, for every location in a spray, the PDI system generates a set of raw droplet data records, each record describing one of the droplets that was sensed by the receiver while passing through the measurement volume. In an illustrative example, the PDI system record includes: droplet diameter, velocity component(s), arrival time, crossing time, peak signal intensity. Other parameters may be acquired as well.

Next, during 610, one or more validation criteria are applied to the set of raw droplet data records. The criterion may be determined ahead-of-time or during post-processing. During validation, the system rejects droplet records falling outside of allowable combinations of mark values (e.g. large diameters with small peak signal intensities). The output of stage 610 is a validated set of raw droplet data records.

During 620, the system determines an effective sampling area for each of the raw droplet data records rendered during 610. The effective sampling area, in accordance with an illustrative example, is determined according to a physical model-based function that is at least based on: (1) a trajectory of the droplet, and (2) at least a second primary mark of the droplet data record. By way of example, the second primary mark is a recorded droplet diameter that governs the value for the effective beam width that is used, in turn, to determine the measurement volume.

During 630, the system multiplies the previously calculated effective sampling area for each drop by a fraction of area that passes all validation criteria. This fraction is determined according to the predicted distribution of secondary mark(s) upon which the validations operate. This is the validation-compensated effective sampling area for the droplet which is equal to- or less than the effective sampling area for a given drop without consideration of validation.

The procedure corresponding to operations 600, 610, 620 and 630, described herein above, renders a list of droplets where each droplet record contains: a set of marks describing the droplet, and an effective sampling area (trajectory and validation compensated in accordance with steps 620 and 630) for the specific droplet. During 640, the system performs an operation on the set of droplet records rendered during 630 to provide an ensemble characteristic on the set of droplet records. By way of example, the "ensemble" comprises a set of droplet records obtained from a given location in a spray field of a spray nozzle under test. Generating sets of droplet data records from various locations within a spray nozzle droplet field results in a collection of ensembles, with each ensemble corresponding to a particular droplet field location. The effective sampling area provided in each droplet record in an ensemble, or collection of ensembles, may be used in a variety of ways based upon the ensemble characteristic of interest. Two examples follow.

Example (1)

Mean Diameter: To determine the arithmetic mean diameter ($D_{10}$) for an ensemble of droplets we need to weight each measured diameter by the effective sampling area for each droplet.

$$D_{10} = \frac{\sum_i A_i \cdot D_i}{\sum_i A_i}$$

Where $D_i$ is the diameter and $A_i$ is the effective sampling area of the ith droplet in the ensemble. Only validated droplets are considered at this point.

Example (2)

Axial Volume Flux: The volume flux ($\Phi_x$) is the total liquid volume that crosses an imaginary surface per unit area per unit time (how fast water fills up a bucket).

$$\Phi_x = \sum_i \frac{\pi D_i^3}{6 \cdot T \cdot A_{x,i}}$$

Where T is the total sampling time and $A_{x,i}$ is the projection of the effective sampling area along the x axis.

Figure 7:
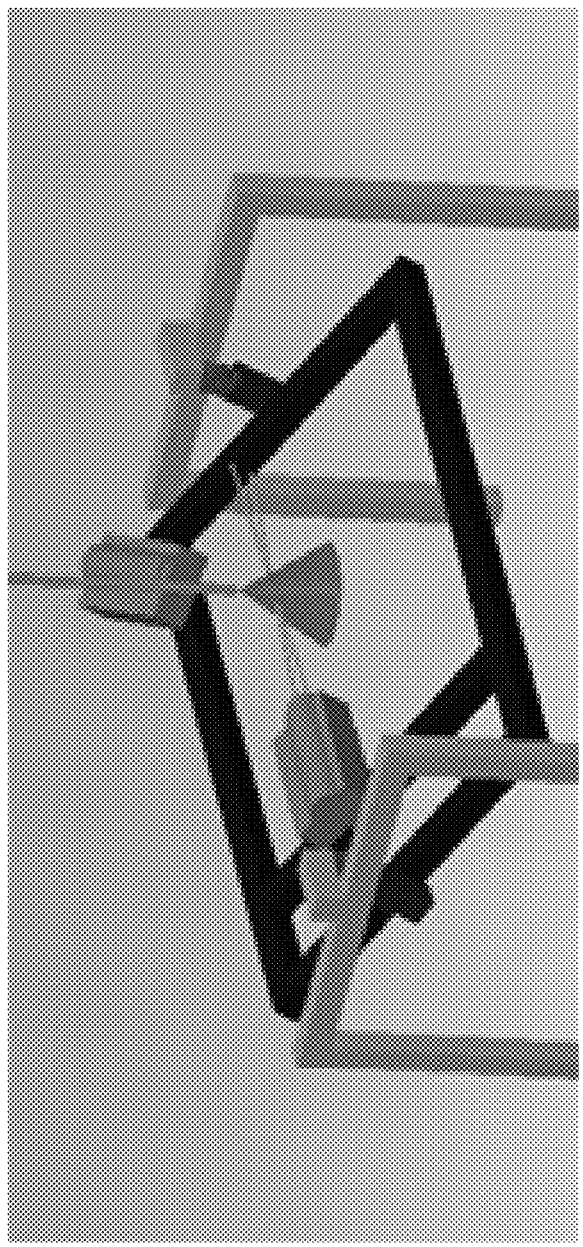
FIG. 7 is a schematic representation of the phase-Doppler interferometry setup used to demonstrate the validity of the approach described herein.

The following is a description of an experimentation that verified the above-described droplet trajectory corrections to effective sampling area. A phase-Doppler interferometry system was installed on a frame that rotated about the transmitter centerline. The accuracy of that axis positioning was to within the transmitter beam diameter at the measurement volume as imaged through a microscope objective. This apparatus was placed below a small, downflowing wind tunnel. A steady spray and the air it entrained flowed through the tunnel. The phase-Doppler instrument was rotated such that the drop angle, theta, varied with respect to the $V_1$ velocity component of the instrument but the spray passing through the measurement region was unchanged. As such, not only is the ensemble flux vector the same, the flux distribution with respect to diameter remains unchanged. A schematic representation of the phase-Doppler data collection apparatus is provided in FIG. 7. The axis of rotation was fixed to the beam crossing location such that various spray angles could be generated without a change of the spray as may occur due to gravity effects if the instrument were to remain fixed and the spray nozzle rotated.

A number of data ensembles were collected for instrument offset angles ranging from −48 to +48 degrees. At each angle, several amplifier gains were chosen for data collection. The flux distribution for each ensemble was calculated with the effective sampling area as described previously applied to each droplet. By changing the amplifier gain between runs the minimum droplet diameter also changed as did the diameter for which detector saturation was reached. In this setup, any changes to the measurements are entirely due to data collection and/or processing issues as the spray remains unchanged—even as the drop angle distribution can be varied.

Figure 8:
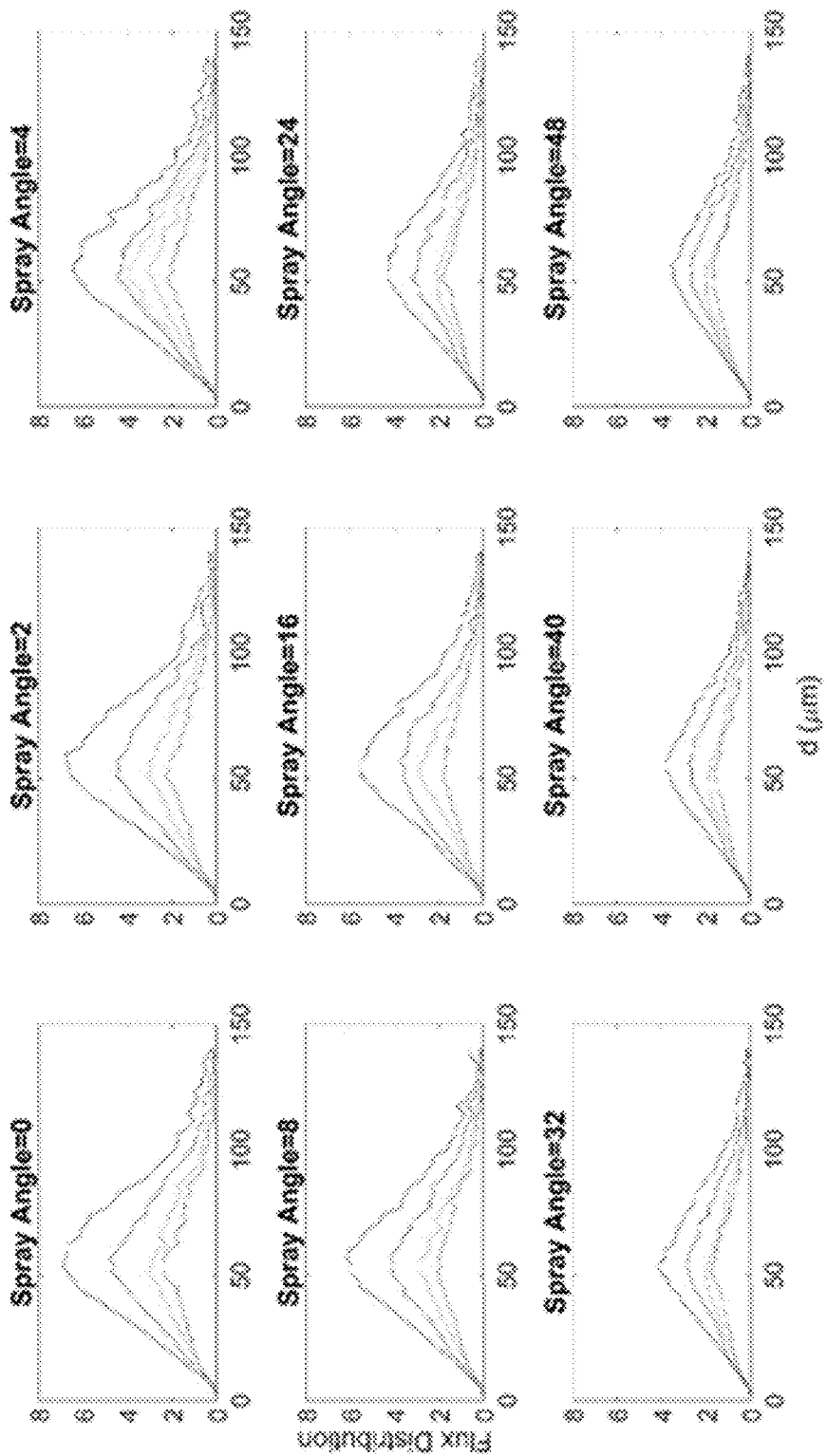
FIG. 8 depicts an array of plots the flux distributions for four amplifier gain settings for each of 9 different instrument offset angles using state-of-the-art area calculation.
Figure 9:
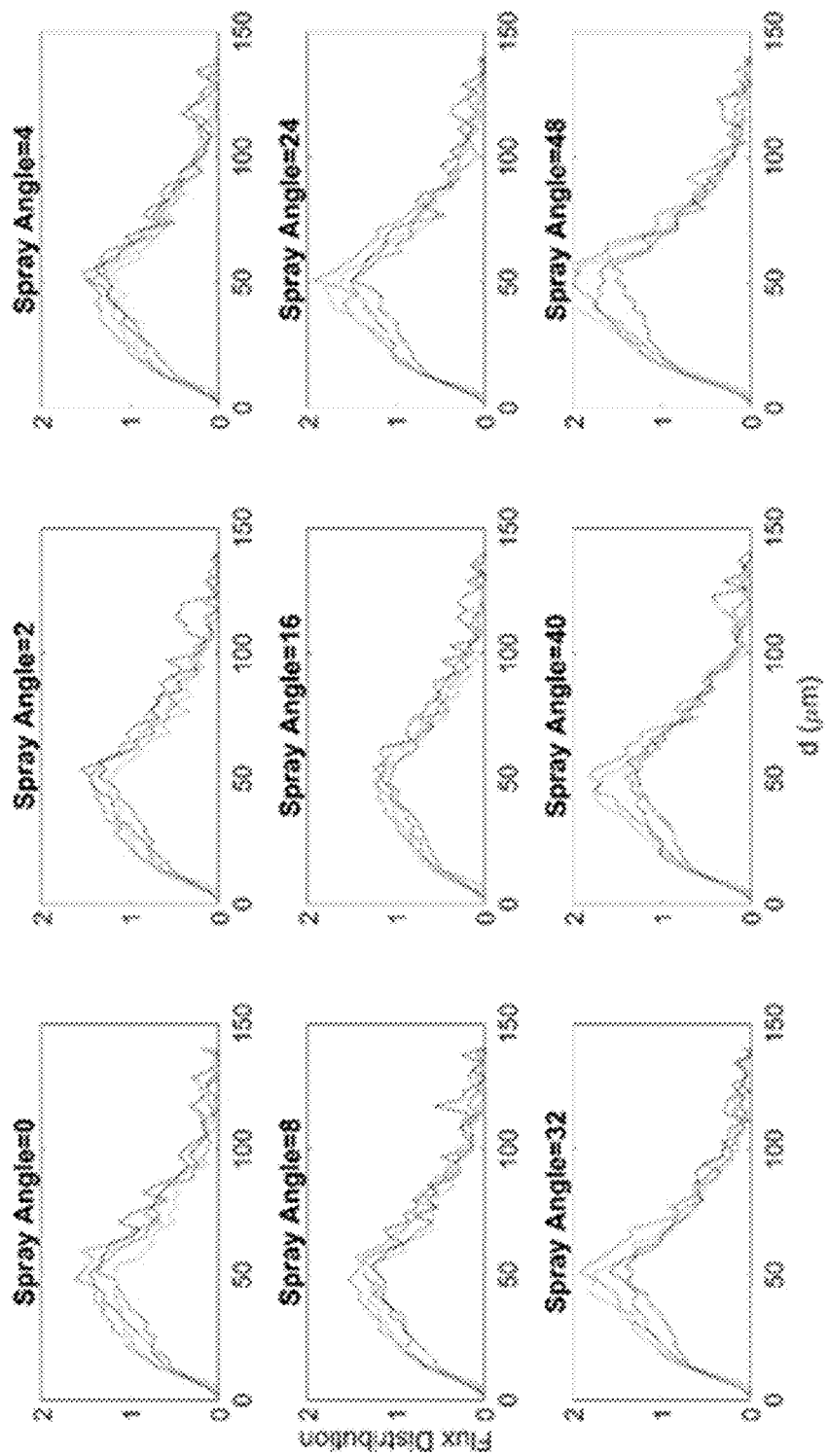
FIG. 9 depicts the flux distributions used in FIG. 7, but are plotted using the droplet trajectory and validation corrections to the effective area calculation.

Turning to FIG. 8, an array of plots the flux distributions are shown for four amplifier gain settings for each of 9 different instrument offset angles. As can be seen, the flux distributions between instrument setups at the same angles do not match and the disagreement between angles is noticeable. Turning to FIG. 9, those same distributions are plotted using the droplet trajectory and data validation corrections to effective area calculation described herein. For every angle there is excellent agreement between sets with the same angle offset but different settings.

Validation criteria can take many forms. Validations can be based on a single mark (e.g. L*>0.25), as a function of multiple marks (e.g. L*<0.5·$\sqrt{\text{Ind*}}$) or Boolean operations between multiple expressions.

Regarding corrections to the sampling area, if all possible droplets with all possible marks are accepted, the effective sampling area would simply be the projection of the measurement volume along each droplet's trajectory. However, eliminating certain combinations of marks in order to reject mis-measured droplets can be used.

Useful validation criteria should not be sensitive to chosen limits. If data is properly corrected, eliminating more or fewer drops will not change the result as the effective area will scale with the change in number.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for rendering a characteristic for a set of particles measured while passing through a measurement volume of a particle optical measurement system, the method comprising:
acquiring a raw particle data for the set particles passing through the measurement volume of the particle optical measurement system, where the raw particle data comprises a set of raw particle records, and where each particle record comprises at least:

a trajectory of at least one particle into the measurement volume, and a second primary mark of the at least one particle whose value influences an effective sampling area corresponding to the measurement volume;

generating and storing, for each one of the set of raw particle records to render a sampling area-corrected set of particle records, an effective sampling area based upon:

the trajectory of the at least one particle into the measurement volume, and the second primary mark of the at least one particle;

rendering an ensemble characteristic for the set of particles by performing an operation on the sampling area-corrected set of particle records.

2. The method of claim 1, wherein the effective sampling area is further determined by applying a validation factor that either does not change or reduces a value for the effective sampling area.

3. The method of claim 2, wherein the effective sampling area is further determined by applying a detection factor that either does not change or reduces a value for the effective sampling area based upon a fraction of particles passing through the measurement volume that did not result in a record generated and stored in the set of raw particle records.

4. The method of claim 1, wherein the second primary mark is a particle dimension.

5. The method of claim 4, wherein the particle dimension is a particle diameter.

6. The method of claim 1, wherein a value of the effective sampling area is determined by a two-dimensional projection of the measurement volume oriented according to the trajectory of the mark into the measurement volume.

7. The method of claim 6, wherein a value of the effective sampling area is determined by an effective beam width of an intersecting beam pair of a phase-Doppler interferometry apparatus.

8. The method of claim 1, wherein the ensemble characteristic is a spray flux.

9. The method of claim 1, wherein the ensemble characteristic is a mean droplet size.

10. The method of claim 1, wherein the ensemble characteristic is a cumulative—volume representative mark.

11. The method of claim 10, wherein the cumulative-volume representative mark is a particle physical size parameter.

12. The method of claim 11, wherein the particle physical size parameter is a diameter.

13. The method of claim 1, wherein the set of particles are a set of droplets.

14. The method of claim 13, wherein droplets of the set of droplets are ejected from a spray nozzle into the measurement volume containing a fluid.

* * * * *